(12) United States Patent
Rensing

(10) Patent No.: US 10,890,473 B2
(45) Date of Patent: Jan. 12, 2021

(54) OFF-RESONANCE CYCLING FOR CORIOLIS FLOWMETERS

(71) Applicant: Micro Motion, Inc., Boulder, CO (US)

(72) Inventor: Matthew Joseph Rensing, Cincinnati, OH (US)

(73) Assignee: Micro Motion, Inc., Boulder, CO (US)

( * ) Notice: Subject to any disclaimer, the term of this patent is extended or adjusted under 35 U.S.C. 154(b) by 264 days.

(21) Appl. No.: 15/745,014

(22) PCT Filed: Jul. 27, 2015

(86) PCT No.: PCT/US2015/042295
§ 371 (c)(1),
(2) Date: Jan. 15, 2018

(87) PCT Pub. No.: WO2017/019024
PCT Pub. Date: Feb. 2, 2017

(65) Prior Publication Data
US 2018/0209831 A1    Jul. 26, 2018

(51) Int. Cl.
*G01F 1/84*  (2006.01)
*G01F 25/00*  (2006.01)

(52) U.S. Cl.
CPC ............ *G01F 1/8436* (2013.01); *G01F 1/849* (2013.01); *G01F 1/8418* (2013.01); *G01F 25/0007* (2013.01); *G01F 1/8427* (2013.01)

(58) Field of Classification Search
None
See application file for complete search history.

(56) References Cited

U.S. PATENT DOCUMENTS 6,092,429 A  *  7/2000  Cunningham  ......... G01N 9/002
                                             73/861.356
6,199,022 B1 *  3/2001  Cunningham  ........ G01F 1/8431
                                             702/54
(Continued)

FOREIGN PATENT DOCUMENTS

DE    102007028209 A1   12/2008
WO    2006036139 A1     4/2006
(Continued)

*Primary Examiner* — Gregory J Toatley, Jr.
*Assistant Examiner* — Brandon J Becker
(74) *Attorney, Agent, or Firm* — The Ollila Law Group LLC

(57) ABSTRACT

A method is provided comprising the steps of exciting a vibration mode of a flow tube (130, 130'), wherein first and second drivers (180L, 180R) are amplitude modulated out of phase from each other, and wherein a drive command provided to the first and second drivers (180L, 180R) comprises a sum of N+1 independent signals. The first and second drivers (180L, 180R) are excited with a plurality of off-resonance frequencies and the effective phase between a modal response and the drivers (180L, 180R) at each of the off-resonance frequencies is inferred. A left eigenvector phase estimate is generated for each of the off-resonance frequencies. A phase of a left eigenvector at a resonant drive frequency is estimated based on off-resonance frequency phase estimates. The method also comprises measuring the phase between a first pickoff (170L) and a second pickoff (170R) and determining a phase of a right eigenvector for the flow tube (130, 130').

15 Claims, 9 Drawing Sheets

(56) References Cited

U.S. PATENT DOCUMENTS

| | | | |
|---|---|---|---|
| 6,311,136 B1 * | 10/2001 | Henry | G01F 1/8404 |
| | | | 702/45 |
| 7,313,488 B2 * | 12/2007 | Henry | G01F 1/74 |
| | | | 702/45 |
| 7,441,469 B2 | 10/2008 | Shelley et al. | |
| 7,706,987 B2 * | 4/2010 | Sharp | G01F 1/8436 |
| | | | 702/48 |

FOREIGN PATENT DOCUMENTS

| | | | |
|---|---|---|---|
| WO | 2008152060 A1 | 12/2008 | |
| WO | WO-2008152060 A1 * | 12/2008 | G01F 1/849 |

* cited by examiner

OFF-RESONANCE CYCLING FOR CORIOLIS FLOWMETERS

FIELD OF THE INVENTION

The invention is related to the field of flowmeters, and in particular, to calibrating Coriolis flowmeters.

BACKGROUND OF THE INVENTION

Mass flow rate is measured in a Coriolis flowmeter by vibrating a fluid-carrying tube(s) and measuring the time delay (or phase angle) between the vibration responses at two or more locations on the tube(s). For practical situations, the time delay varies linearly with mass flow rate; however, the time delay is generally not zero at zero mass flow. There is usually a zero-flow delay or offset caused by a number of factors such as non-proportional damping, residual flexibility response, electromagnetic crosstalk, or phase delay in instrument electronics, for example.

This zero-flow offset is typically corrected for by measuring the zero-flow offset during a zero-flow condition and subtracting the measured offset from subsequent measurements made during flow. This would be sufficient to correct for the zero-flow offset problem if the zero-flow offset remained constant. Unfortunately, the zero-flow offset can be affected by small changes in the ambient environment (such as temperature) or to changes in the piping system through which the material is flowing. The changes in the zero-flow offset will cause errors in the measured flow rates. During normal operations there may be long periods of time between no-flow conditions, and the flowmeter can only be calibrated by zeroing the meter only during these no-flow conditions. The changes in the zero-offset over time may therefore cause significant errors in the measured flow.

The operation of Coriolis flowmeters can be described using mathematical formulas, as more fully described in U.S. Pat. Nos. 7,441,469 and 7,706,987 which are both assigned on their face to Micro Motion, Inc. and are hereby incorporated by reference. The general system of first order differential equations describing the motion of a linear system is:

$$\begin{bmatrix} C & M \\ M & 0 \end{bmatrix} \begin{Bmatrix} \dot{x} \\ \ddot{x} \end{Bmatrix} + \begin{bmatrix} K & 0 \\ 0 & -M \end{bmatrix} \begin{Bmatrix} x \\ \dot{x} \end{Bmatrix} = \begin{Bmatrix} f \\ 0 \end{Bmatrix} \quad (1)$$

In Equation (1) M and K are the mass and stiffness matrices of the system and C is a general damping matrix which may have a symmetric component due to damping and a skew symmetric component due to Coriolis force.

$$A\dot{q} + Bq = u \quad (2)$$

Equation 1 can be rewritten as Equation 2 where A is equal to the matrix $$\begin{bmatrix} C & M \\ M & 0 \end{bmatrix},$$

B is equal to the matrix $$\begin{bmatrix} K & 0 \\ 0 & -M \end{bmatrix},$$

and u is equal to $$\begin{Bmatrix} f \\ 0 \end{Bmatrix}.$$

Insight into the equation of motion can be gained by looking at Equations 1 and 2. The generalized eigenvalue problem associated with Equation (2) may be solved for the right eigenvectors, $\phi^{(r)}$, such that:

$$B\phi^{(r)} = -A\phi^{(r)}\lambda \quad (3)$$

For symmetric A and B matrices, the eigenvector can be used to diagonalize, or decouple the equations of motion. Decoupled equations are readily solved. For a non-symmetric system for example, where C includes the Coriolis matrix, the right eigenvectors do not diagonalize the equations of motion, resulting in coupled equations. Coupled equations are more difficult to solve and hinder insight into the solution. Left eigenvectors are required to diagonalize non-symmetric A or B matrices. The following derivations show the process. The left eigenvectors are obtained by solving the following generalized eigenvalue problem:

$$\phi^{(l)T}B = -\phi^{(l)T}A\lambda$$

$$B^T\phi^{(l)} = -A^T\phi^{(l)}\lambda \quad (4)$$

M and K would generally be symmetric for a Coriolis flowmeter. For no flow, C would also be symmetric; thus, the system matrices, A and B would be symmetric. In this case, Equations (3) and (4) are identical and the left and right eigenvectors are the same. When there is flow, the associated non-symmetry of the C matrix causes the left and right eigenvectors to be different.

Consider the j'th right eigenvector:

$$B\phi_j^{(r)} = -A\phi_j^{(r)}\lambda_j \quad (5)$$

and the i'th left eigenvector:

$$\phi_i^{(l)T}B = -\phi_i^{(l)T}A\lambda_i \quad (6)$$

Pre-multiplying Equation (5) by $\phi_i^{(l)T}$, and post multiplying Equation (6) by $\phi_j^{(r)T}$ and subtracting the two yields:

$$0 = -\phi_i^{(l)T} A \phi_j^{(r)}(\lambda_j - \lambda_i) \quad (7)$$

$$\Rightarrow \phi_i^{(l)T} A \phi_j^{(r)} = 0 \text{ for } i \neq j$$

By multiplying Equation (5) by $$\frac{1}{\lambda_j}$$

and Equation (6) by $$\frac{1}{\lambda_i}$$

and going through the same procedure it can be shown:

$$\Rightarrow \phi_i^{(l)T} B \phi_j^{(r)} = 0 \text{ for } i \neq j \quad (8)$$

Equations (7) and (8) show that by pre- and post-multiplying either of the system matrices, A or B, by the matrix of left eigenvectors, $\Phi^{(L)}$, and the matrix of right eigenvectors, $\Phi^{(R)}$, respectively, the system matrices are diagonalized.

$$\Phi^{(L)^T} A \Phi^{(R)} = \begin{bmatrix} \ddots & & \\ & M_A & \\ & & \ddots \end{bmatrix} \quad (9)$$

$$\Phi^{(L)^T} B \Phi^{(R)} = \begin{bmatrix} \ddots & & \\ & M_B & \\ & & \ddots \end{bmatrix}$$

The fact that the left and right eigenvector matrices diagonalize the system matrices means that both the set of right eigenvectors and the set of left eigenvectors are linearly independent. Either set can be used as a basis of a coordinate system for the response. Recognizing that the difference between the left and right eigenvectors is due to the skew-symmetric Coriolis matrix, forms one basis of this invention.

In terms of a mathematical model of the flowmeter, the mass, stiffness and damping matrices which model non-Coriolis effects are symmetric. For a no-flow system, the left and right eigenvectors are identical (within an arbitrary scale factor). The Coriolis force associated with flow, however, manifests itself in the mathematical model as a skew symmetric damping matrix (the transpose is the negative of the original matrix). The skew symmetric Coriolis matrix causes the left and right eigenvectors of the system to be different. For a flowing system with no non-proportional damping, the phase between different coefficients of the left eigenvectors is equal and opposite to the phase between the same coefficients on the right eigenvectors. For a system with non-proportional damping, these phase values are offset equally for both the left and right eigenvectors, however, the difference remains the same.

Thus, if the phase characteristics of the left and right eigenvectors can be measured accurately, this characteristic allows the phase attributable to zero-offset from non-proportional damping and the phase attributable to material flow to be distinguished, eliminating associated zero-offset errors.

Additionally, it is important to note that phase-to-frequency conversions may prove to be a source of inaccuracy, and this is particularly noteworthy when a flowmeter system is driven with a closed-loop feedback signal. Utilizing such a feedback scheme, something that would otherwise result in a phase change in the open-loop characteristics of the system, such as switching from a left driver to a right driver, for example, instead manifests as a shift in the drive frequency. In lightly damped flowmeters in particular, a relatively large amount of phase change therefore manifests as a comparatively small frequency shift; this means that observing phase effects in a closed loop drive is prohibitively challenging, as the frequency changes become too small to detect. This and other issues are addressed by embodiments provided. Overall, there is a need for a system and method for accurately calibrating the zero-flow offset during flow, and this is provided by embodiments related to measuring open-loop test signals that are driven off-resonance.

SUMMARY OF THE INVENTION

A method is provided according to an embodiment. The method comprises exciting a vibration mode of a flow tube, wherein exciting the vibration mode of the flow tube comprises the steps of: periodically driving a first driver and periodically driving a second driver, wherein the first and second drivers are amplitude modulated out of phase from each other, and wherein a drive command provided to the first and second drivers comprises a sum of N+1 independent signals, and measuring the phase between a first pickoff and a second pickoff. The method further comprises exciting the first and second drivers with a plurality of off-resonance frequencies and inferring the effective phase between a modal response and the first driver and second driver at each of the plurality of off-resonance frequencies. Additionally, the method comprises generating a left eigenvector phase estimate at each of the off-resonance frequencies, determining a phase of a right eigenvector for the flow tube, and estimating a phase of a left eigenvector at a resonant drive frequency based on the phase estimates at the off-resonance frequencies.

A method is provided according to an embodiment. The method comprises flowing a material through a flow tube and periodically exciting a vibration mode of the flow tube such that a first driver is periodically driven and a second driver is periodically driven, wherein the first and second drivers are amplitude modulated out of phase from each other, and wherein a drive command provided to the first and second drivers comprises a sum of N+1 independent signals. The method further comprises periodically exciting the first and second drivers with a plurality of off-resonance frequencies, measuring the relative motion of the vibrating flow tube, measuring a phase of a right eigenvector while exciting the vibration mode of the flow tube, and inferring the effective phase between a modal response and the first driver and second driver at each of the plurality of off-resonance frequencies. Additionally, the method comprises generating a left eigenvector phase estimate at each of the off-resonance frequencies, and estimating a phase of a left eigenvector at a resonant drive frequency based on the phase estimates at the off-resonance frequencies. Material flow through the flow tube is determined using the phase of a right eigenvector corrected by a zero offset. The method also comprises determining a new zero offset without stopping the material flow through the flow tube using a phase of the left eigenvector for the flow tube and determining the material flow through the flow tube using the phase of a right eigenvector corrected by the new zero offset.

A vibratory flowmeter is provided according to an embodiment. The vibratory flowmeter comprises a sensor assembly including one or more flow tubes and first and second pickoff sensors as well as first and second drivers configured to vibrate the one or more flow tubes. Meter electronics are coupled to the first and second pickoff sensors and coupled to the first and second drivers, with the meter electronics being configured to provide a first signal to the first and second drivers wherein the first and second drivers are amplitude modulated out of phase from each other, and wherein a drive command provided to the first and second drivers comprises a sum of N+1 independent signals, wherein the first and second drivers are excited with a plurality of off-resonance frequencies and the effective phase between a modal response and the first driver and the second driver is inferred at each of the plurality of off-resonance frequencies, wherein a left eigenvector phase estimate is generated for each of the off-resonance frequencies and wherein the meter electronics is further configured to measure the phase between a first pickoff and a second pickoff and determine a phase of a right eigenvector for the flow tube, and a phase of a left eigenvector at a resonant drive frequency is estimated based on the plurality of phase estimates at the off-resonance frequencies.

Aspects

According to an aspect, a method comprises: exciting a vibration mode of a flow tube, wherein exciting the vibration mode of the flow tube comprises the steps of: periodically driving a first driver; periodically driving a second driver, wherein the first and second drivers are amplitude modulated out of phase from each other, and wherein a drive command provided to the first and second drivers comprises a sum of N+1 independent signals; measuring the phase between a first pickoff and a second pickoff; exciting the first and second drivers with a plurality of off-resonance frequencies; inferring the effective phase between a modal response and the first driver and second driver at each of the plurality of off-resonance frequencies; generating a left eigenvector phase estimate at each of the off-resonance frequencies; determining a phase of a right eigenvector for the flow tube; and estimating a phase of a left eigenvector at a resonant drive frequency based on the phase estimates at the off-resonance frequencies.

Preferably, the sum of N+1 independent signals comprises an on-resonance drive command provided as a closed-loop feedback of a measured pickoff signal, wherein the first driver and second driver receive the same drive command, and a plurality of amplitude modulated open-loop off-resonance drive commands, wherein the drive command provided to the first driver is amplitude modulated out of phase with the drive command provided to the second driver.

Preferably, the method further comprises generating a model of phase change that is a function of the plurality of off-resonance frequencies.

Preferably, the step of determining an actual flow of the material through the flow tube further comprises: determining an uncorrected flow of the material through the flow tube using the phase of the right eigenvector; and determining a zero offset for the flow of the material through the flow tube by comparing the uncorrected flow with the actual flow.

Preferably, the method further comprises determining a material flow through the flow tube using the phase of the right eigenvector corrected by the zero offset.

Preferably, the method further comprises determining the phase of a right eigenvector; and determining a zero offset for the flow of the material through the flow tube by averaging the phase of the right eigenvector with the phase of the left eigenvector, co-locating the first driver with the first pickoff sensor, and co-locating the second driver with the second pickoff sensor.

Preferably, the step of periodically driving the first driver with the first signal comprises sinusoidally driving the first driver, and wherein the step of periodically driving the second driver with the first signal comprises sinusoidally driving the second driver.

Preferably, the method comprises continually measuring the left and right eigenvector phases and directly generating a Δt value from the difference between the left eigenvector phase and the right eigenvector phase.

According to an aspect, a method comprises flowing a material through a flow tube; periodically exciting a vibration mode of the flow tube such that a first driver is periodically driven and a second driver is periodically driven, wherein the first and second drivers are amplitude modulated out of phase from each other, and wherein a drive command provided to the first and second drivers comprises a sum of N+1 independent signals; periodically exciting the first and second drivers with a plurality of off-resonance frequencies; measuring the relative motion of the vibrating flow tube; measuring a phase of a right eigenvector while exciting the vibration mode of the flow tube; inferring the effective phase between a modal response and the first driver and second driver at each of the plurality of off-resonance frequencies; generating a left eigenvector phase estimate at each of the off-resonance frequencies; estimating a phase of a left eigenvector at a resonant drive frequency based on the phase estimates at the off-resonance frequencies; determining the material flow through the flow tube using the phase of a right eigenvector corrected by a zero offset; determining a new zero offset without stopping the material flow through the flow tube using a phase of a left eigenvector for the flow tube; and determining the material flow through the flow tube using the phase of a right eigenvector corrected by the new zero offset.

Preferably, the method further comprises co-locating the first driver with the first pickoff sensor; and co-locating the second driver with the second pickoff sensor.

According to an aspect, a vibratory flowmeter comprises a sensor assembly including one or more flow tubes and first and second pickoff sensors; first and second drivers configured to vibrate the one or more flow tubes; and meter electronics coupled to the first and second pickoff sensors and coupled to the first and second drivers, with the meter electronics being configured to provide a first signal to the first and second drivers wherein the first and second drivers are amplitude modulated out of phase from each other, and wherein a drive command provided to the first and second drivers comprises a sum of N+1 independent signals, wherein the first and second drivers are excited with a plurality of off-resonance frequencies and the effective phase between a modal response and the first driver and the second driver is inferred at each of the plurality of off-resonance frequencies, wherein a left eigenvector phase estimate is generated for each of the off-resonance frequencies and wherein the meter electronics is further configured to measure the phase between a first pickoff and a second pickoff and determine a phase of a right eigenvector for the flow tube, and a phase of a left eigenvector at a resonant drive frequency is estimated based on the plurality of phase estimates at the off-resonance frequencies.

Preferably, the meter electronics is further configured to determine an uncorrected flow of the material through the one or more flow tubes using the phase of the right eigenvector and to determine a zero offset for the flow of the material through the one or more flow tubes by comparing the uncorrected flow with the actual flow.

Preferably, the meter electronics is further configured to determine a material flow through the one or more flow tubes using the phase of the right eigenvector corrected by the zero offset.

Preferably, the meter electronics is further configured to determine the phase of a right eigenvector and to determine a zero offset for the flow of the material through the one or more flow tubes by weighted averaging the phase of the right eigenvector with the phase of the left eigenvector.

Preferably, the first driver is co-located with the first pickoff sensor, and the second driver is co-located with the second pickoff sensor.

Preferably, the first signal comprises a sinusoid.

DETAILED DESCRIPTION

FIGS. 1-9 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
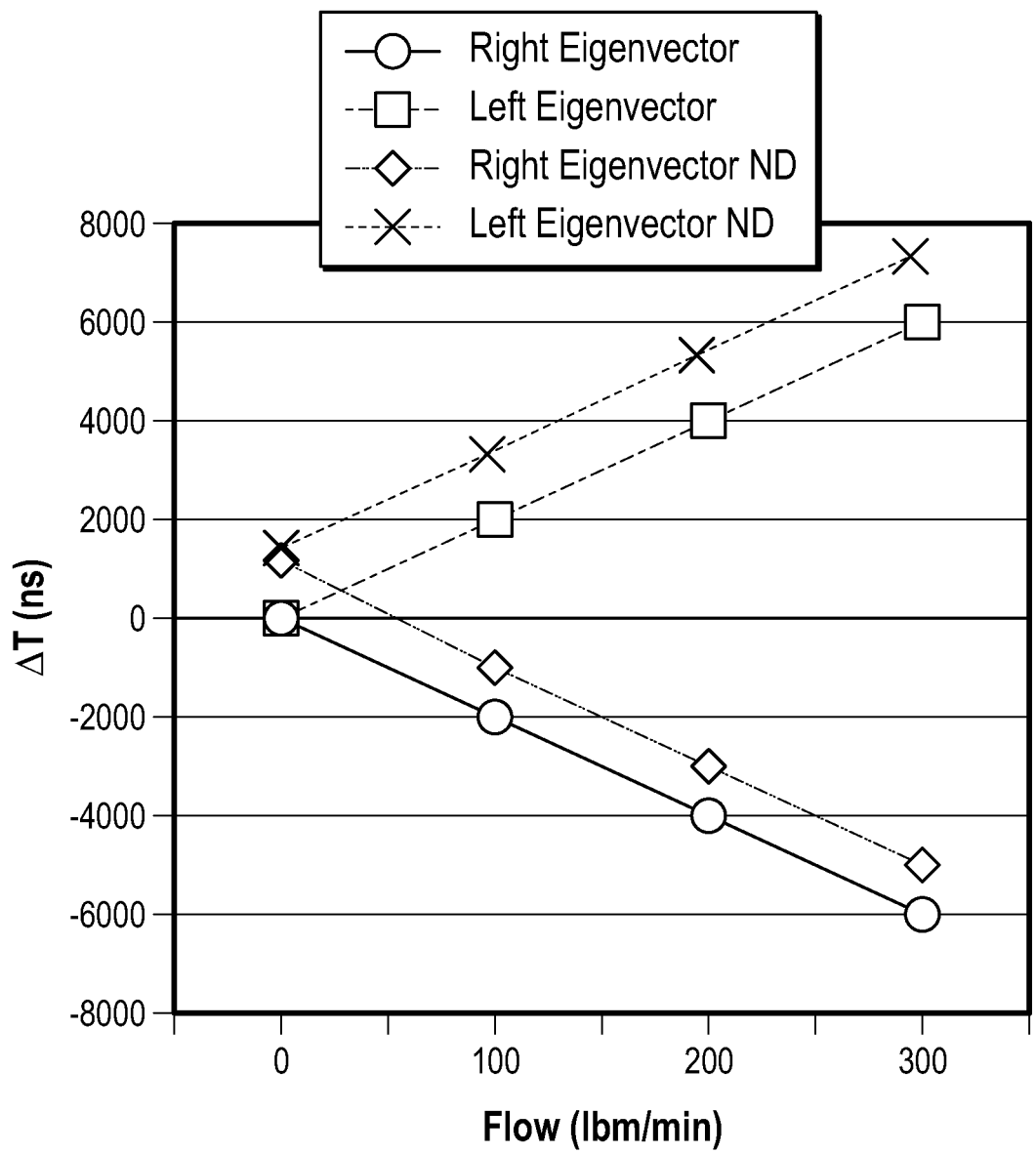
FIG. 1 illustrates a phase difference between flowmeter pickoff sensors (right eigenvector) and drivers (left eigenvector)

Residual flexibility, electromagnetic crosstalk and electronic measurement system characteristics all contribute to zero-offset. One interpretation of these effects is that they introduce error in the measurement of the right eigenvector phase. If the drive mode (right eigenvector) could be measured exactly, non-proportional damping would be the only effect causing zero offset and this error would be easily distinguished from flow effects using the left and right eigenvector ΔT information. In the case where drivers and pickoffs are co-located, the phase due to other sources will be the same on drivers and pickoffs, but phase due to flow will produce a negative effect on the drivers as for the pickoffs. This allows phase due to flow to be isolated as the difference between pickoff and driver phases. Therefore, a flow measurement independent of zero effects may be made. Turning to FIG. 1, left and right eigenvector phases are illustrated. As noted above, it will be clear that non-proportional damping (noted as ND in FIG. 1) causes an offset in the left and right eigenvector phases, and phases with flow remain unaffected. This offset is simply the average, and can be removed by differencing the measurements. This principle serves as a background foundation for the embodiments presented.

Figure 2:
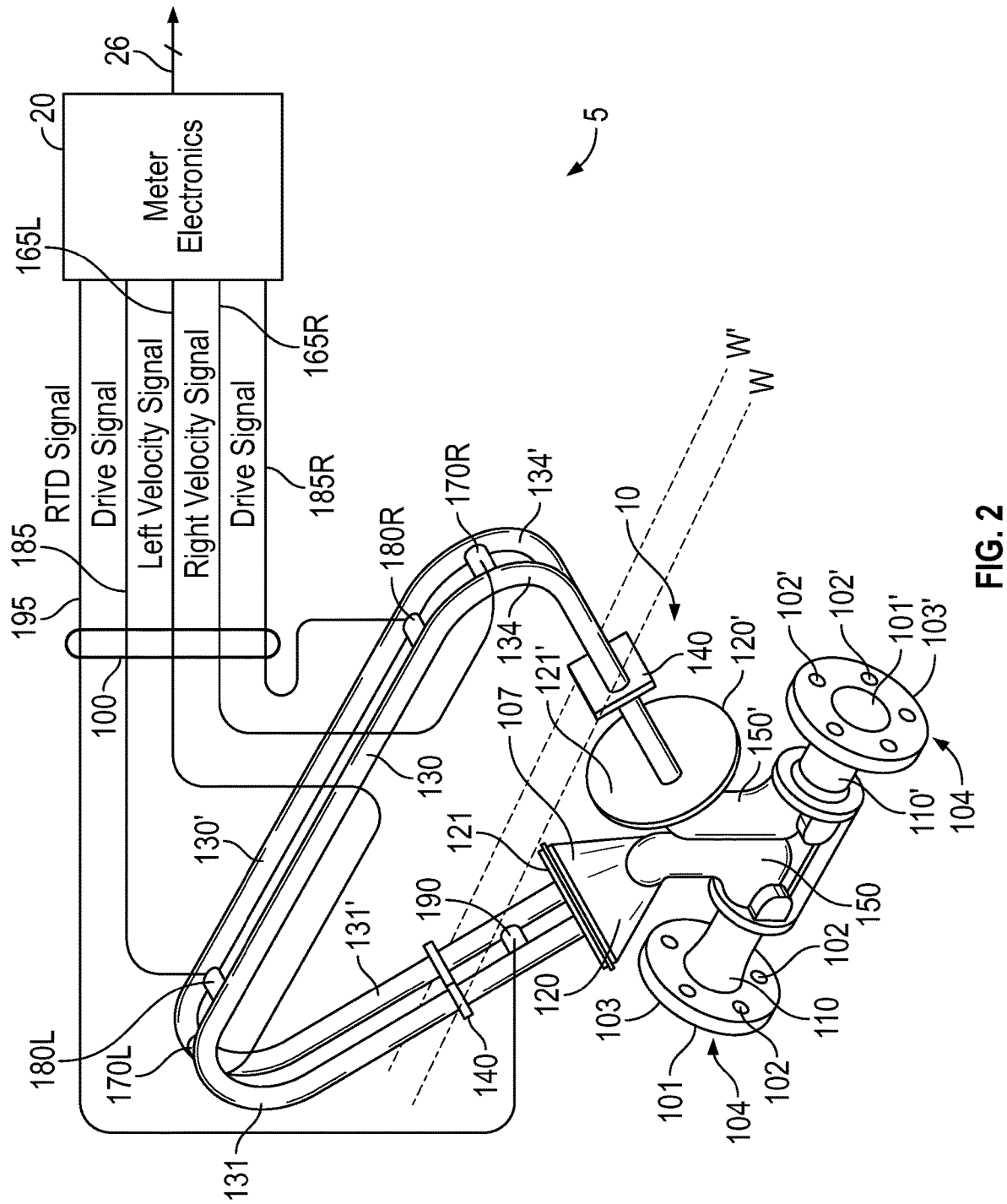
FIG. 2 is a vibratory flowmeter according to an embodiment.

FIG. 2 shows a vibratory flowmeter 5 according to an embodiment. The flowmeter 5 comprises a sensor assembly 10 and meter electronics 20 coupled to the sensor assembly 10. The sensor assembly 10 responds to mass flow rate and density of a process material. The meter electronics 20 is connected to the sensor assembly 10 via the leads 100 to provide density, mass flow rate, and temperature information over a communication link 26, as well as other information.

A Coriolis flowmeter structure is described, although it is apparent to those skilled in the art that the present invention could also be operated as a vibrating tube densitometer.

The sensor assembly 10 includes manifolds 150 and 150', flanges 103 and 103' having flange necks 110 and 110', parallel flow tubes 130 and 130', first and second drivers 180L and 180R, and first and second pickoff sensors 170L and 170R. The first and second drivers 180L and 180R are spaced apart on the one or more flow tubes 130 and 130'. In addition, in some embodiments the sensor assembly 10 may include a temperature sensor 190. The flow tubes 134 and 130' have two essentially straight inlet legs 131 and 13' and outlet legs 134 and 134' which converge towards each other at the flow tube mounting blocks 120 and 120'. The flow tubes 130 and 130' bend at two symmetrical locations along their length and are essentially parallel throughout their length. The brace bars 140 and 140' serve to define the axis W and the substantially parallel axis W' about which each flow tube oscillates. It should be noted that in an embodiment, the first driver 180L may be co-located with the first pickoff sensor 170L, and the second driver 180R may be co-located with the second pickoff sensor 170R.

The side legs 131, 131' and 134, 134' of the flow tubes 130 and 130' are fixedly attached to flow tube mounting blocks 120 and 120' and these blocks, in turn, are fixedly attached to the manifolds 150 and 150'. This provides a continuous closed material path through the sensor assembly 10.

When the flanges 103 and 103', having holes 102 and 102' are connected, via the inlet end 104 and the outlet end 104' into a process line (not shown) which carries the process material that is being measured, material enters the end 104 of the meter through an orifice 101 in the flange 103 and is conducted through the manifold 150 to the flow tube mounting block 120 having a surface 121. Within the manifold 150 the material is divided and routed through the flow tubes 130 and 130'. Upon exiting the flow tubes 130 and 130', the process material is recombined in a single stream within the manifold 150' and is thereafter routed to the exit end 104' connected by the flange 103' having bolt holes 102' to the process line (not shown).

The flow tubes 130 and 130' are selected and appropriately mounted to the flow tube mounting blocks 120 and 120' so as to have substantially the same mass distribution, moments of inertia, and Young's modulus about the bending axes W-W and W'-W', respectively. These bending axes go through the brace bars 140 and 140'. Inasmuch as the Young's modulus of the flow tubes change with temperature, and this change affects the calculation of flow and density, the resistive temperature detector (RTD) 190 is mounted to the flow tube 130', to continuously measure the temperature of the flow tube. The temperature dependent voltage appearing across the RTD 190 may be used by the meter electronics 20 to compensate for the change in the elastic modulus of the flow tubes 130 and 130' due to any changes in flow tube temperature. The RTD 190 is connected to the meter electronics 20 by the lead 195.

Figure 3A:
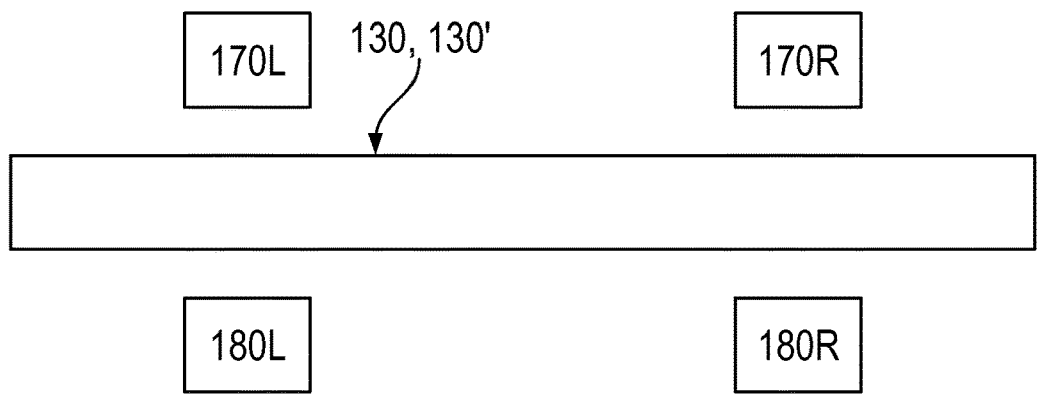
FIG. 3A is a top view of a flow tube in an un-deflected position in an example embodiment of the invention.
Figure 3B:
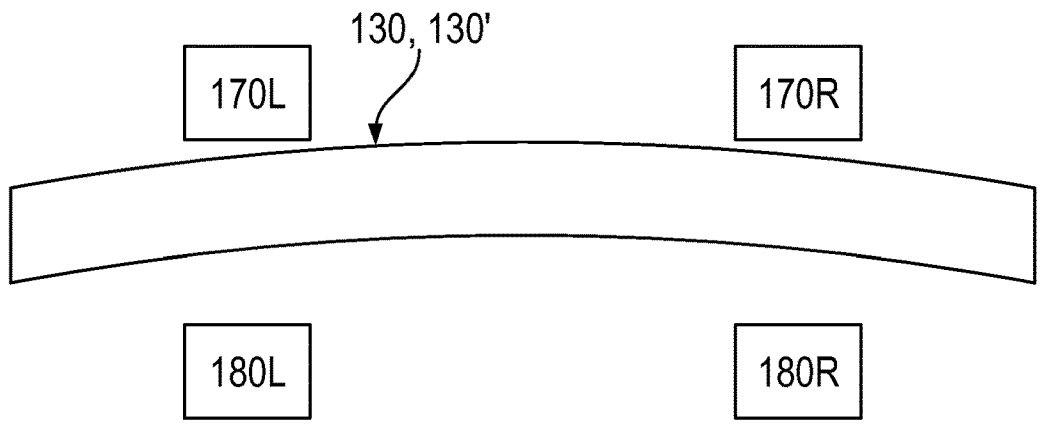
FIG. 3B is a top view of a flow tube in a deflected position corresponding to the main bending mode in an example embodiment of the invention.
Figure 3C:
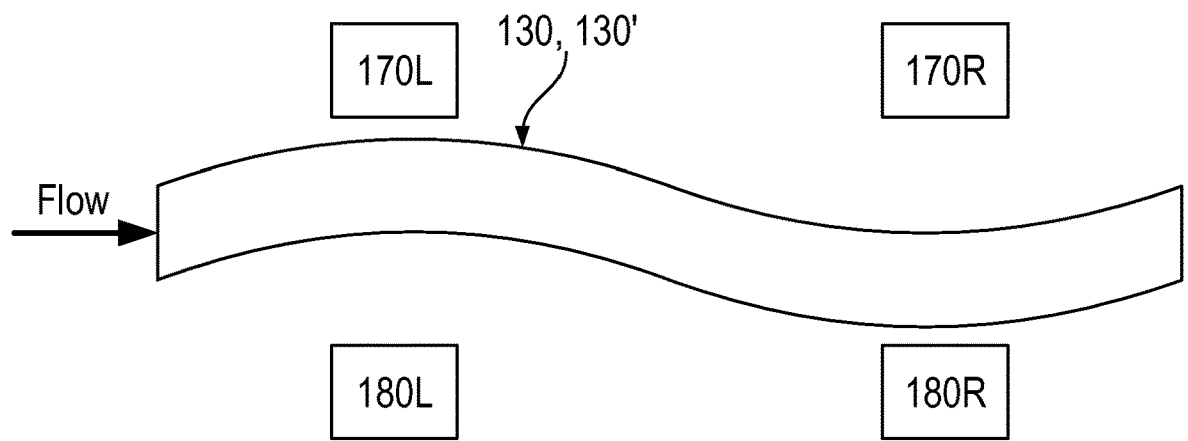
FIG. 3C is a top view of a flow tube in a deflected position corresponding to a twisting mode induced by Coriolis forces in an example embodiment of the invention.

FIGS. 3A-3C show a top view of a flow tube 130, 130' configured to contain a material flowing therethrough. Two drivers 180L, 180R and two pickoff sensors 170L, 170R are spaced along the flow tube 130, 130'. In the preferred mode, the two drivers 180L, 180R are spaced symmetrically around the axial center of the flow tube 130, 130'. The drivers 180L, 180R are configured to impart a force to the flow tube 130, 130' to excite a vibration mode in the flow tube 130, 130'. The force may be substantially coherent (e.g. confined to a narrow frequency) or may be broadband. The drivers 180L, 180R can be such known means as a magnet attached to the flow tube 130, 130', and a coil attached to a reference, through which an oscillating current is passed, for example, without limitation.

170L and 170R depict two pickoff sensors co-located with drivers 180L and 180R. The sensors are configured to produce a plurality of signals representing the location and motion of the flow tube 130, 130'. The pickoff sensors 170L and 170R may include a variety of devices, such as coil-type velocity transducers, optical or ultrasonic motion sensors, laser sensors, accelerometers, inertial rate sensors and the like. In this embodiment there are two pickoff sensors 170L and 170R shown with each sensor co-located with one of the drivers 180L and 180R. Other configurations having more than two sensors are also possible.

FIG. 3A shows the flow tube 130, 130' in an un-deflected state. By driving the drivers 180L, 180R with equal power, the main bending mode of the flow tube can be excited. U.S. Pat. No. 6,092,429, entitled "Driver for Oscillating a Vibrating Conduit", which is assigned on its face to Micro Motion, Inc., and hereby incorporated by reference, discloses drivers configured to excite different modes of vibration in a flow tube. FIG. 3B shows the flow tube 130, 130' in a deflected state corresponding to the main bending mode of the flow tube 130, 130'. This vibration mode also corresponds to a condition when there is no flow of material through the flow tube 130, 130'. The deflection of the flow tube 130, 130' in FIGS. 3B and 3C have been magnified for clarity. The actual deflections of flow tube 130, 130' would be much smaller. When material is flowing through the vibrating flow tube 130, 130', the flowing material causes Coriolis forces to be generated. The Coriolis forces deflect the flow tube 130, 130' and excite additional vibration modes. FIG. 3C shows the main vibration mode excited by the Coriolis forces. The phase difference detected between sensor 170L and sensor 170R can be used to determine the material flow through the flow tube 130, 130'. In a no-flow condition (as depicted in FIG. 3B), there is no phase difference due to flow detected between 170L and 170R. It should be noted, however, that there may be phase differences due to zero-offset conditions. Once material is flowing through the flow tube 130, 130', there will be a phase difference between 170L and 170R, which is due to flow. The measured phase difference detected between 170L and 170R is a measure of the phase of the right eigenvector of the system and is proportional to the material flow through the flow tube. Let $\theta_R$ equal the phase of the right eigenvector, $\theta_1$ be the measured phase of the vibration of the flow tube at sensor 170L, and $\theta_2$ be the measured phase of the vibration of the flow tube at sensor 170R, then:

$$\theta_R = \theta_1 - \theta_2 \quad (10)$$

A time difference, $\Delta t$, can be calculated from the phase difference by dividing by the vibration frequency $\omega$.

$$\Delta t = (\theta_1 - \theta_2)/\omega \quad (11)$$

The time difference $\Delta t$ is also proportional to the material flow through the flow tube and is a measurement typically used in mass flowmeters. A more accurate determination for the material flow through the flow tube 130, 130' can be calculated by correcting the measured material flow with a zero-offset amount, to derive a corrected $\Delta t$, $\Delta t_C$:

$$\Delta t_C = \Delta t - \text{ZeroOffset} \quad (12)$$

In one example embodiment of the invention, during normal operations, both drivers are used to excite the main bending mode of the flow tube. An example of the material flow through the flow tube is determined by measuring the phase of the right eigenvector, converting to a $\Delta t$ domain, $\Delta t_R$, and correcting this value with a zero-offset correction amount to determine a corrected $\Delta t_R$, $\Delta t_{RC}$:

$$\Delta t_{RC} = \Delta t_R - \text{ZeroOffset} \quad (13)$$

In an embodiment, the flow tube is excited by amplitude modulating first and second drivers directly out of phase from each other. In an embodiment, the drivers are both periodically driving with a frequency corresponding to resonance. In an embodiment, a drive command is provided to each driver that is the sum of N+1 independent signals. One of the provided signals is the on-resonance drive command, which is provided as a closed-loop feedback of the measured pickoff signals, preferably with other tonal content on the pickoffs filtered out. This signal is the same for both drivers, and is not modulated. The remaining N signals are open-loop synthesized signals, at N off-resonance frequencies. Each of these signals is synthesized in phase with each other, but amplitude modulated directly out of phase with each other on the left and right drivers. The drive signals are amplitude modulated at a much lower frequency. This lower frequency is the cycling frequency at which phase/frequency shift is later demodulated. The drive amplitude modulation signals (at the cycling frequency) are out of phase. The drive signal to each driver at the resonance/drive frequency are essentially identical signals, and are multiplied by the corresponding modulation signal. The periodic sweep may be sinusoidal, square, saw-toothed, etc. Measurements are taken between the phase of the driving signals and one or more positions on the flow tube. These measurements are used to determine the phase of the left eigenvector of the system. It should be noted that measuring phase between pickoffs is a straightforward task: given two pickoff signals, $X_1$ and $X_2$, phase between them can be directly computed as $$\angle \frac{X_1}{X_2},$$

which is effectively the phase of $X_1$ minus the phase of $X_2$. This phase difference is the right eigenvector phase. Measuring the phase between drivers is more complicated, however. Drive signals are inputs to the system, so the phase between drivers is theoretically the difference between whatever signals set thereto. However, this fails to take into account the system as a whole. Determining the effective phase between each driver and the modal response takes into account system characteristic. In practice, by measuring the phase from the driver to a particular pickoff, it is possible to compute $$\angle \frac{\left(\frac{X_i}{F_1}\right)}{\left(\frac{X_i}{F_2}\right)}.$$

This calculation is complicated by virtue that one cannot measure $(X_i/F_1)$ at the same time as measuring $(X_i/F_2)$ since if both drivers are driven at the same time and the same frequency, one cannot distinguish the individual effects of the two drivers. Therefore, in an embodiment, the phase of a pickoff, when driving at a given tone solely on a first driver, is compared to the phase of a pickoff when driving solely on the second driver. Thus the necessity for out-of-phase cycling of the drivers at this frequency.

Figure 4:
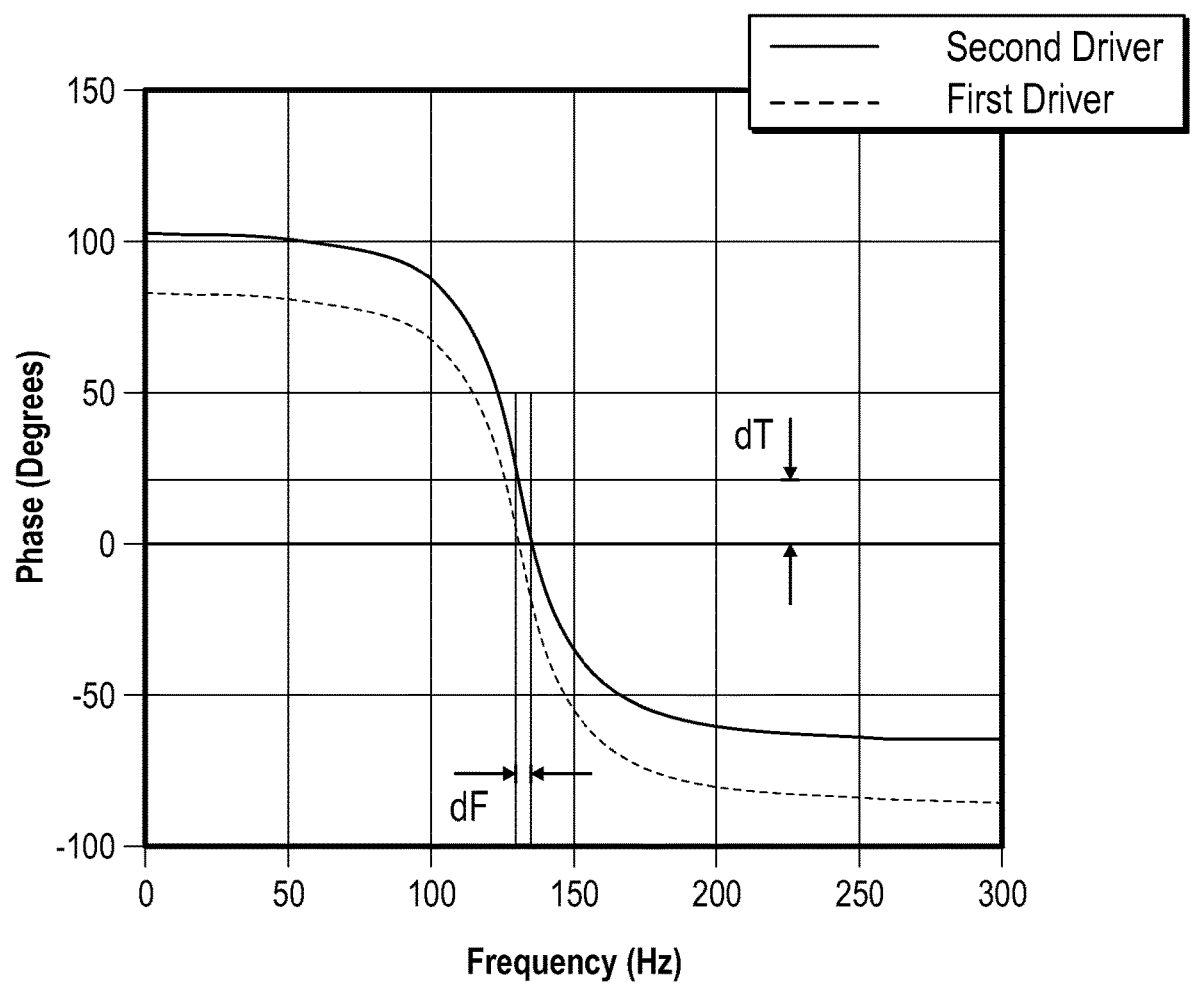
FIG. 4 illustrates an example of transforming a phase into a frequency.

Turning to FIG. 4, it will be clear that a major difficulty inherent in this approach is that the system's transformation of phase into frequency is quite sharp, meaning that a very little frequency change occurs for a comparatively large phase change through the meter, which is additionally difficult to invert. As indicated above, when the flowmeter 5 is driven using a closed-loop feedback signal such that one or more pickoff signals is scaled and fed back to generate the drive signal, phase to frequency transformations may pose some difficulties. Under this feedback drive scheme, something that would otherwise be a phase change in the open-loop characteristics of the system instead manifests as a shift in the drive frequency. This is inherent in the nature of a feedback drive system. Since phase in an open loop system must, by definition, be made to match the phase in the feedback portion of the system, getting these phases to match requires a change in drive frequency, which automatically falls out of the closed-loop controller. FIG. 4 is particularly relevant to a lightly damped flowmeter 5, as a relatively large amount of phase change manifests as a comparatively small frequency shift, to the extent that frequency changes may become too small to accurately detect.

Figure 5:
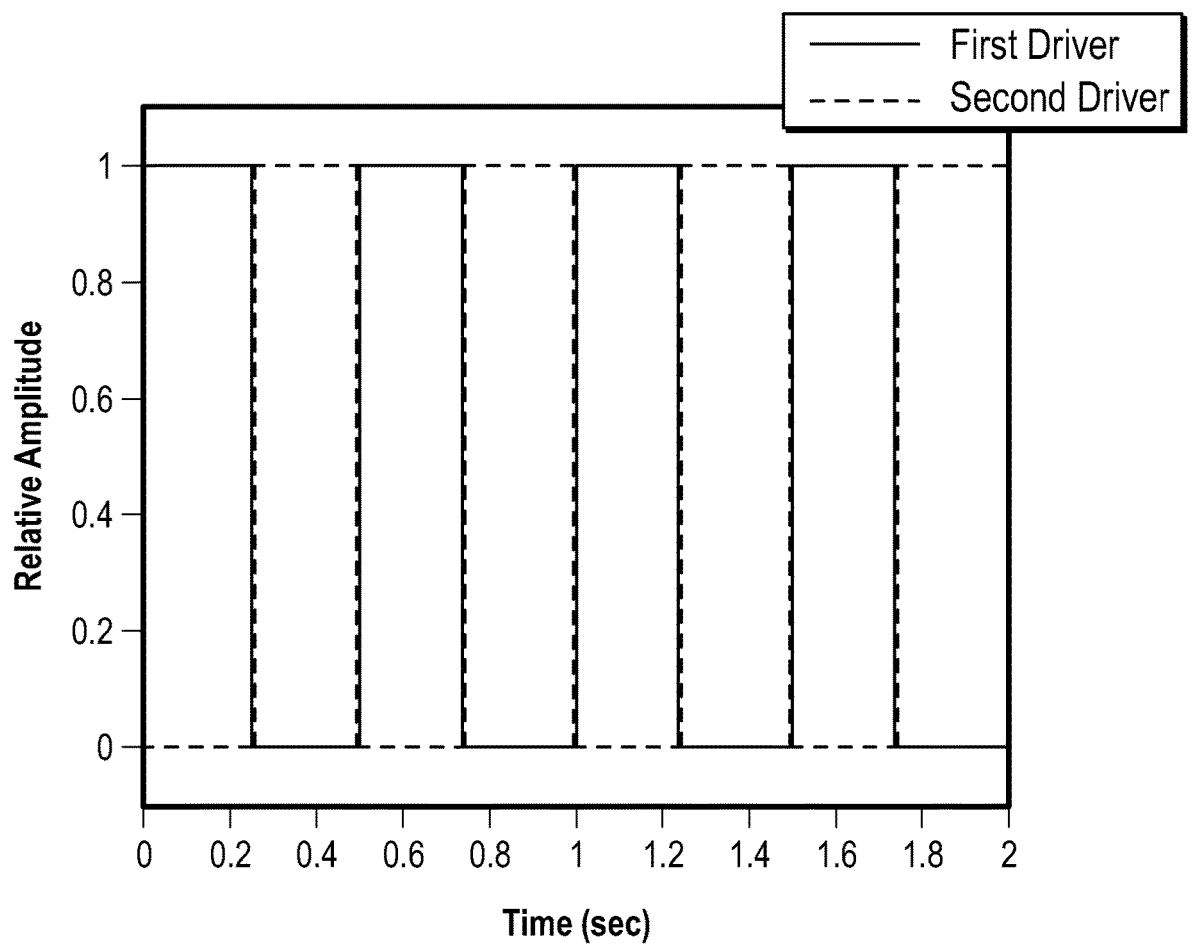
FIG. 5 illustrates prior art binary phase switching.
Figure 6:
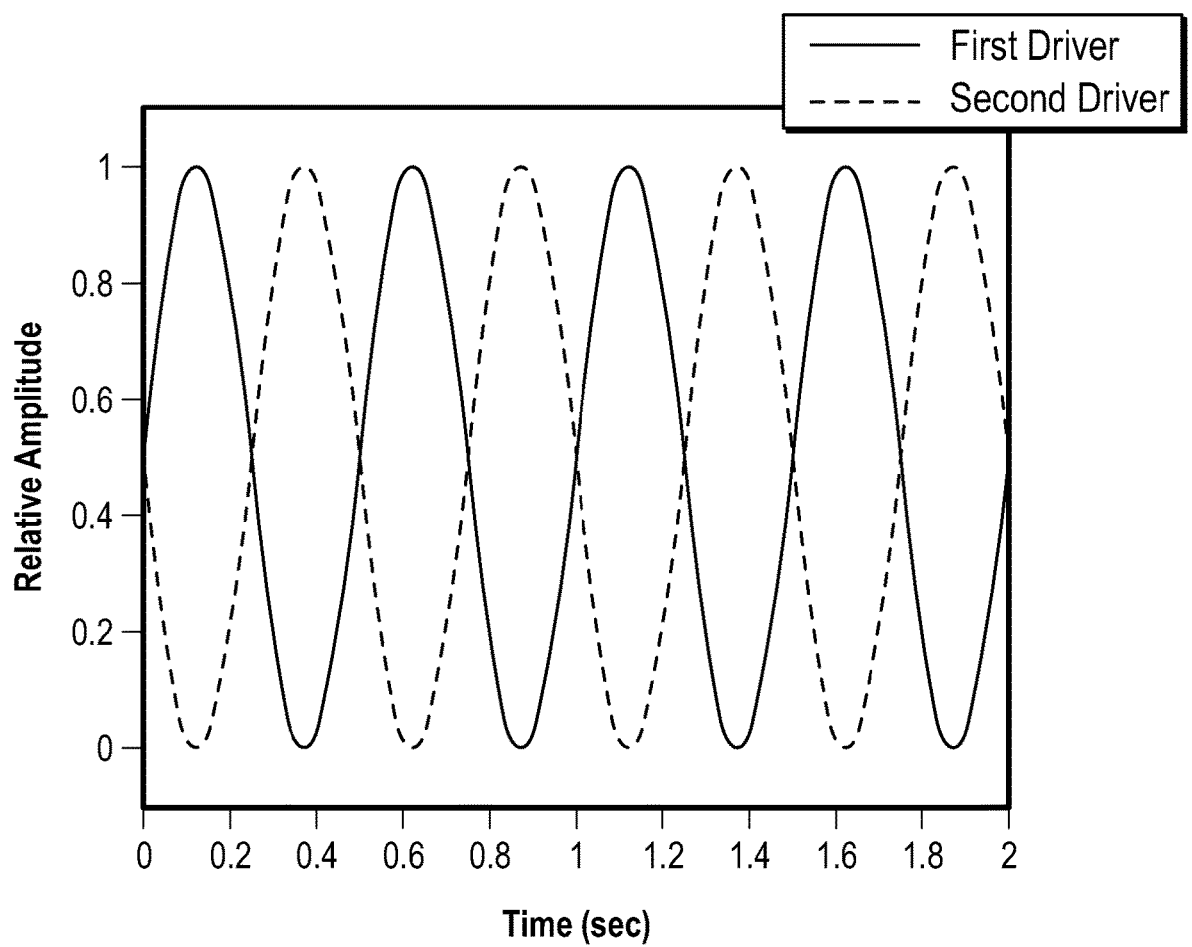
FIG. 6 illustrates periodic phase switching according to an embodiment.

As a result, the required frequency accuracy is quite exacting—on the order of nanohertz. Prior art approaches to this phase switching effectively toggle between drivers in a binary fashion. This requires a wait of at least several seconds (15-30) for the signal to decay before observing the new frequency from the newly toggled driver. Such a long delay is impractical for a usable system. When such an abrupt drive transition is used to continually cycle the drive back and forth, the transient response of the system to the transitions never actually totally decays, which ends up obscuring the desired drive frequency variation. This is illustrated in FIG. 5. Turning to FIG. 6, an embodiment is illustrated wherein the drive amplitudes are cycled periodically to minimize transient signals. This approach minimizes the slope of the drive amplitude changes in time (given a required cycling frequency), thereby minimizing impulsive shocks to the system. With this approach, the drive is entirely on one driver or the other only momentarily, minimizing any transient response. In an embodiment, only the on-resonance drive is powered by a closed feedback loop. Additional off-resonance tones are generated in an open-loop manner, and thus phase effects can be directly observed rather than inferred from smaller frequency shifts.

Figure 7:
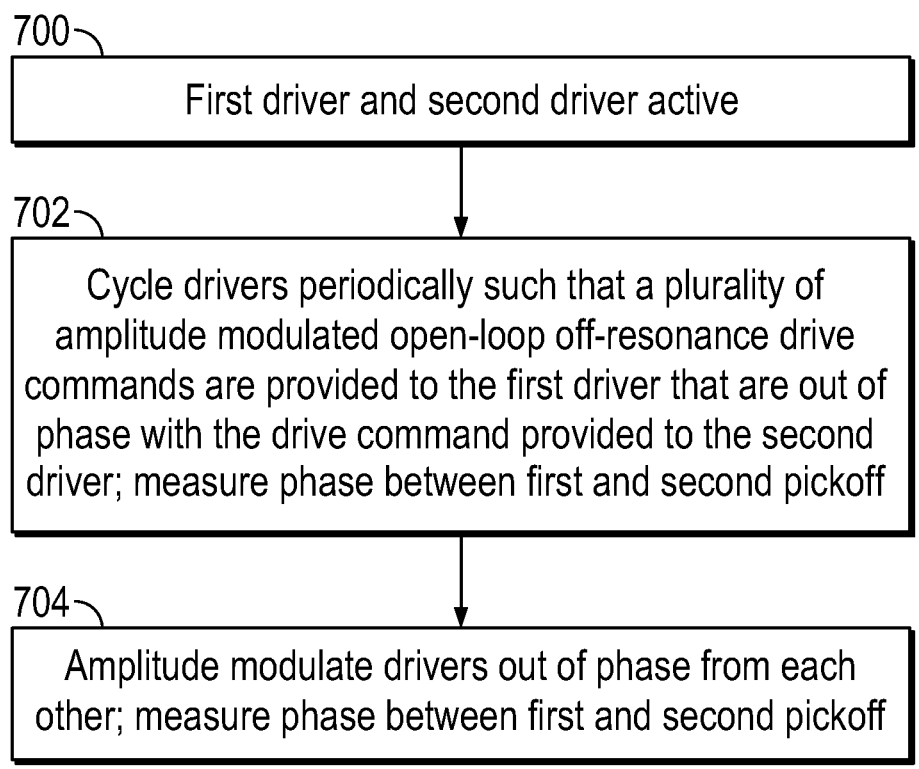
FIG. 7 is a flow chart illustrating determining a phase of a right eigenvector according to an embodiment.

FIG. 7 is a flow chart illustrating a determination of a phase of a right eigenvector of the system in an example embodiment. At step 700, during normal operations, both first and second drivers 180L, 180R are used to excite the vibration of the flow tube 130, 130'. The drivers 180L, 180R are cycled periodically, wherein the first and second drivers are amplitude modulated out of phase from each other, and wherein a drive command provided to the first and second drivers 180L, 180R comprises a sum of N+1 independent signals. An on-resonance drive command is, in an embodiment, provided as a closed-loop feedback of a measured pickoff signal, wherein the first driver 180L and second driver 180R receive the same drive command. At step 702, a plurality of amplitude modulated open-loop off-resonance drive commands are provided to the first driver 180L that are out of phase with the drive commands provided to the second driver 180R. During this time, the phase between the first pickoff sensor 170L and the second pickoff sensor 170R is measured. This will be called phase difference $\theta_1$.

In step 704, as the drivers 180L, 180R are amplitude modulated out of phase from each other, the phase between the pickoff sensor 170L and pickoff sensor 170R is measured. This will be called phase difference $\theta_2$.

Figure 8:
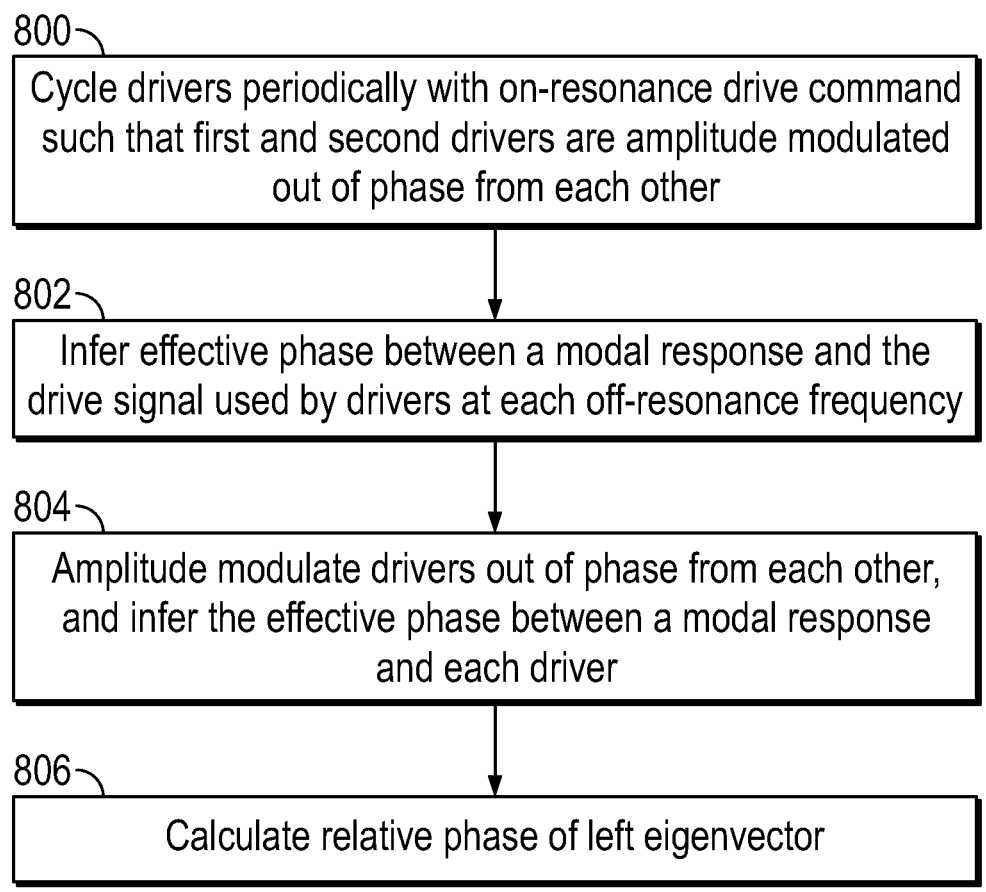
FIG. 8 is a flow chart illustrating determining a phase of a left eigenvector according to an embodiment.

FIG. 8 is a flow chart illustrating the determination of a phase of a left eigenvector in an example embodiment. At step 800, during normal operations, both drivers 180L, 180R are used to excite the vibration of the flow tube 130, 130'. The drivers 180L and 180R are cycled periodically, wherein the first and second drivers are amplitude modulated out of phase from each other, and wherein a drive command provided to the first and second drivers comprises a sum of N+1 independent signals. An on-resonance drive command is, in an embodiment, provided as a closed-loop feedback of a measured pickoff signal, wherein the first driver 180L and second driver 180R receive the same drive command. At step 802, when the first driver 180L excites the vibration of the flow tube at a maximal amplitude, the effective phase between a modal response and the driving signal used by the first driver 180L and the second driver 180R is inferred at each off-resonance frequency. This inferred phase difference will be called $\theta_3$.

At step 804, as the drivers 180L, 180R are cycled periodically, at this point the first and second drivers are amplitude modulated out of phase from each other. The effective phase between a modal response and the first driver 180L and the second driver 180R is inferred. This will be called phase difference $\theta_4$.

At step 806, the phase of the left eigenvector $\theta L$ for the system may be calculated as:

$$\theta L = \theta_3 - \theta_4 \tag{14}$$

Converting to the time domain yields the relative $\Delta t$ of the left eigenvector, $\Delta t_L$:

$$\Delta t_L = (\theta_3 - \theta_4)/\omega \tag{15}$$

In one example embodiment, the determination for when the re-calibration should occur may be done by using a fixed time interval between calibrations. In another example embodiment, a re-calibration may be done when changes in the environment or the piping system are detected. For example, when a change in temperature is greater than a threshold amount, a re-calibration may be performed. The determination for when re-calibration occurs may be a combination of a periodic timer and detecting changes in environment. The time period between re-calibrations may be shorter for systems that require higher accuracy than for systems that have less stringent accuracy requirements. Switching between drivers 180L and 180R in order to measure the phase of the left eigenvector does not imply that the normal operation of the flowmeter has to be interrupted (i.e. measuring flow using $\Delta t$ of the right eigenvector). In yet another example, a flowmeter is simply monitored continually for changes to the zero, so an embodiment for a zero verification tool is contemplated. This is useful in a number of applications, such as custody transfer, for example without limitation, wherein the zero is not permitted to be changed, except under particular circumstances. The left and right eigenvector phases may be continually measured, and then directly used to generate a flow $\Delta t$ signal from the difference between them.

As noted, a problem encountered in prior art approaches relates to isolating the phase effects due to switching drivers from the other transient effects from the controller. In particular, when drivers are switched abruptly, the system may react with unwanted transient responses. The drive controller tends to reinforce these step changes in the system. When this abrupt drive transition is used to continually cycle the drive back and forth, the transient response of the system to the transitions tends to never decay, so the desired drive frequency variation is obscured. Another issue, as noted above, is the sensitivity of the frequency measurement. If one simply examines the raw frequency signal when cycling drivers, changes of interest are obfuscated by noise effects. Signal processing methods and electronics are described in U.S. Pat. No. 5,734,112, which is assigned on its face to Micro Motion, Inc. and is hereby incorporated by reference.

Figure 9:
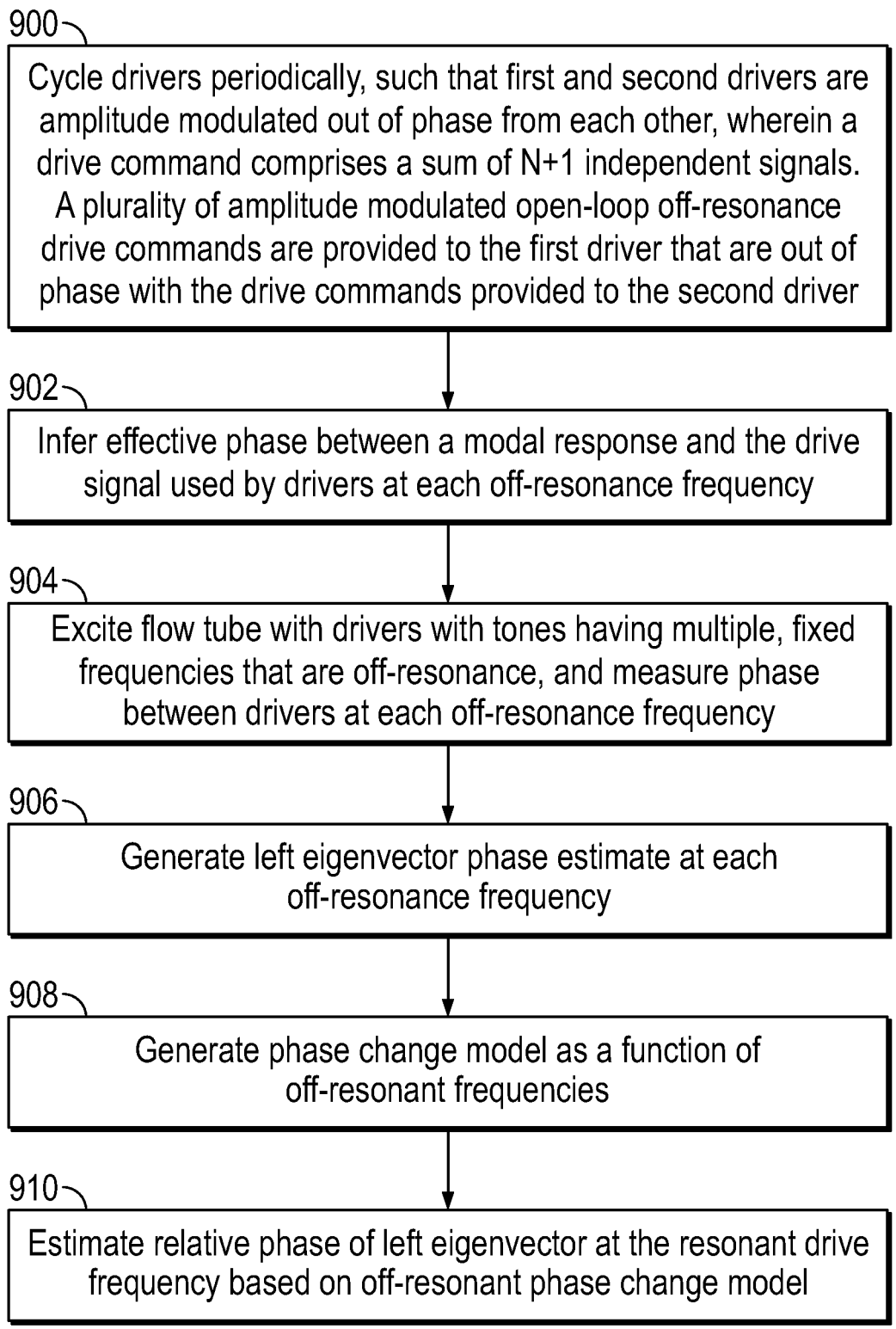
FIG. 9 is a flow chart illustrating estimating a phase of a left eigenvector according to an embodiment.

Turning to FIG. 9, in an embodiment, during normal operations, both the first and second drivers 180L, 180R are used to periodically excite the vibration of the flow tube 130, 130', which is illustrated in step 900. The drivers 180L and 180R are cycled periodically, and the first and second drivers are amplitude modulated out of phase from each other, and wherein a drive command provided to the first and second drivers comprises a sum of N+1 independent signals. An on-resonance drive command is, in an embodiment, provided as a closed-loop feedback of a measured pickoff signal, wherein the first driver 180L and second driver 180R receive the same drive command. Furthermore, a plurality of amplitude modulated open-loop off-resonance drive commands are provided to the first driver 180L that are out of phase with the drive commands provided to the second driver 180R.

The drivers 180L and 180R may excite the flow tube 130, 130' with tones at multiple, fixed frequencies that are off-resonance. The effective phase between a modal response and the drivers 180L and 180R may also be inferred at each off-resonance frequency, as is illustrated in step 902. It should be noted that the off-resonance frequencies may be higher, lower, or combinations of higher and lower frequencies in relation to the resonant frequency. Step 904 illustrates the continuation of driver cycling, in that the second driver 180R is at a maximal amplitude while the first driver 180L is driven at a minimal amplitude. Again, the drivers 180L and 180R excite the flow tube with tones at multiple, fixed frequencies that are off-resonance, and the phase between 180L and 180R is measured at each off-resonance frequency. Since the frequency of driver cycling is known, variations in that cycling frequency are easily discernable. The amount of phase change measured as the one driver is cycled to another driver, as is done in steps 902 and 904, is equal to the left eigenvector phase at that frequency. In step 906, a left eigenvector phase estimate is generated for each off-resonance frequency. These phases will differ, as each tone has a different ratio of contributions from the drive mode and other, higher-frequency modes. However, with a sufficient number of measurement points, a model of phase change may be created that is a function of frequency, as is shown in step 908. With such a model, the frequency difference at the resonant drive frequency may be accurately estimated, as is illustrated in step 910.

In the embodiments above, both drivers 180L, 180R are utilized to determine the relative Δt of the left eigenvector. In yet another embodiment, only a single driver at a time may be used. For example, driving a first driver, 180L, measuring the phase at a pickoff sensor, 170L, and then driving the second driver, 180R, and subsequently measuring the phase at the same pickoff, 170L, can be used to allow the unique contributions of each driver to be discerned. An inherent drawback on a lightly-damped flowmeter stems from the fact that it takes up to, and even potentially longer than, five minutes for the response from the first driver to decay, which is necessary before the second driver can be activated. In many real-world situations, this is a cumbersome approach due to the long time lag, as environmental conditions may change fast enough to render any measurements obsolete. Thus, a solution to this time lag problem is provided in an embodiment.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Thus, although specific embodiments of, and examples for, the invention are described herein for illustrative purposes, various equivalent modifications are possible within the scope of the invention, as those skilled in the relevant art will recognize. The teachings provided herein can be applied to other vibrating systems, and not just to the embodiments described above and shown in the accompanying figures. Accordingly, the scope of the invention should be determined from the following claims.

I claim:

1. A method, comprising:
   exciting a vibration mode of a flow tube, wherein exciting the vibration mode of the flow tube comprises the steps of:
   periodically driving a first driver;
   periodically driving a second driver, wherein the first and second drivers are amplitude modulated out of phase from each other, and wherein a drive command provided to the first and second drivers comprises a sum of N+1 independent signals for each of the first and second drivers, and where N≠0;
   measuring the phase between a first pickoff and a second pickoff;
   exciting the first and second drivers with a plurality of off-resonance frequencies;
   inferring the effective phase between a modal response and the first driver and second driver at each of the plurality of off-resonance frequencies;
   generating a left eigenvector phase estimate at each of the off-resonance frequencies;
   determining a phase of a right eigenvector for the flow tube; and
   estimating a phase of a left eigenvector at a resonant drive frequency based on the phase estimates at the off-resonance frequencies;
   continually measuring the left and right eigenvector phases; and
   directly generating a Δt value from the difference between the left eigenvector phase and the right eigenvector phase.

2. The method of claim 1, wherein the sum of N+1 independent signals comprises:
   an on-resonance drive command provided as a closed-loop feedback of a measured pickoff signal, wherein the first driver and second driver receive the same drive command; and
   a plurality of amplitude modulated open-loop off-resonance drive commands, wherein the drive command provided to the first driver is amplitude modulated out of phase with the drive command provided to the second driver.

3. The method of claim 1, further comprising:
generating a model of phase change that is a function of the plurality of off-resonance frequencies.

4. The method of claim 3, wherein the step of determining an actual flow of the material through the flow tube further comprises:
determining an uncorrected flow of the material through the flow tube using the phase of the right eigenvector; and
determining a zero offset for the flow of the material through the flow tube by comparing the uncorrected flow with the actual flow.

5. The method of claim 4, further comprising:
determining a material flow through the flow tube using the phase of the right eigenvector corrected by the zero offset.

6. The method of claim 1, further comprising:
determining the phase of a right eigenvector;
determining a zero offset for the flow of the material through the flow tube by averaging the phase of the right eigenvector with the phase of the left eigenvector;
co-locating the first driver with the first pickoff sensor; and
co-locating the second driver with the second pickoff sensor.

7. The method of claim 1, wherein the step of periodically driving the first driver with the first signal comprises sinusoidally driving the first driver, and wherein the step of periodically driving the second driver with the first signal comprises sinusoidally driving the second driver.

8. A method, comprising:
flowing a material through a flow tube;
periodically exciting a vibration mode of the flow tube such that a first driver is periodically driven and a second driver is periodically driven, wherein the first and second drivers are amplitude modulated out of phase from each other, and wherein a drive command provided to the first and second drivers comprises a sum of N+1 independent signals for each of the first and second drivers, and where N≠0;
periodically exciting the first and second drivers with a plurality of off-resonance frequencies;
measuring the relative motion of the vibrating flow tube;
measuring a phase of a right eigenvector while exciting the vibration mode of the flow tube;
inferring the effective phase between a modal response and the first driver and second driver at each of the plurality of off-resonance frequencies;
generating a left eigenvector phase estimate at each of the off-resonance frequencies;
estimating a phase of a left eigenvector at a resonant drive frequency based on the phase estimates at the off-resonance frequencies;
determining the material flow through the flow tube using the phase of a right eigenvector corrected by a zero offset;
determining a new zero offset without stopping the material flow through the flow tube using a phase of a left eigenvector for the flow tube; and
determining the material flow through the flow tube using the phase of a right eigenvector corrected by the new zero offset;
directly generating a Δt value from the difference between the left eigenvector phase and the right eigenvector phase.

9. The method of claim 8, further comprising:
co-locating the first driver with the first pickoff sensor; and
co-locating the second driver with the second pickoff sensor.

10. A vibratory flowmeter (5) comprising:
a sensor assembly (10) including one or more flow tubes (130, 130') and first and second pickoff sensors (170L, 170R);
first and second drivers (180L, 180R) configured to vibrate the one or more flow tubes (130, 130'); and
meter electronics (20) coupled to the first and second pickoff sensors (170L, 170R) and coupled to the first and second drivers (180L, 180R), with the meter electronics (20) being configured to provide a first signal to the first and second drivers (180L, 180R) wherein the first and second drivers (180L, 180R) are amplitude modulated out of phase from each other, and wherein a drive command provided to the first and second drivers (180L, 180R) comprises a sum of N+1 independent signals, signals for each of the first and second drivers, and where N≠0, and wherein the first and second drivers (180L, 180R) are excited with a plurality of off-resonance frequencies and the effective phase between a modal response and the first driver (180L) and the second driver (180R) is inferred at each of the plurality of off-resonance frequencies, wherein a left eigenvector phase estimate is generated for each of the off-resonance frequencies and wherein the meter electronics (20) is further configured to measure the phase between a first pickoff (170L) and a second pickoff (170R) and determine a phase of a right eigenvector for the flow tube (130, 130'), and a phase of a left eigenvector at a resonant drive frequency is estimated based on the plurality of phase estimates at the off-resonance frequencies, wherein the left and right eigenvector phases are continually measured, and a Δt value is directly generated from the difference between the left eigenvector phase and the right eigenvector phase.

11. The vibratory flowmeter (5) of claim 10, with the meter electronics (20) being further configured to determine an uncorrected flow of the material through the one or more flow tubes (130, 130') using the phase of the right eigenvector and to determine a zero offset for the flow of the material through the one or more flow tubes (130, 130') by comparing the uncorrected flow with the actual flow.

12. The vibratory flowmeter (5) of claim 10, with the meter electronics (20) being further configured to determine a material flow through the one or more flow tubes (130, 130') using the phase of the right eigenvector corrected by the zero offset.

13. The vibratory flowmeter (5) of claim 10, with the meter electronics (20) being further configured to determine the phase of a right eigenvector and to determine a zero offset for the flow of the material through the one or more flow tubes (130, 130') by weighted averaging the phase of the right eigenvector with the phase of the left eigenvector.

14. The vibratory flowmeter (5) of claim 10, wherein the first driver (180L) is co-located with the first pickoff sensor (170L), and the second driver (180R) is co-located with the second pickoff sensor (170R).

15. The vibratory flowmeter (5) of claim 10, wherein the first signal comprises a sinusoid.

\* \* \* \* \*